US011575120B2

(12) United States Patent
Hou et al.

(10) Patent No.: US 11,575,120 B2
(45) Date of Patent: Feb. 7, 2023

(54) MICRO-SIZED SECONDARY PARTICLES WITH ENHANCED IONIC CONDUCTIVITY FOR SOLID-STATE ELECTRODE

(71) Applicant: GM Global Technology Operations LLC, Detroit, MI (US)

(72) Inventors: Mengyan Hou, Shanghai (CN); Zhe Li, Shanghai (CN); Qili Su, Shanghai (CN); Xiaochao Que, Shanghai (CN); Meiyuan Wu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 44 days.

(21) Appl. No.: 16/598,237

(22) Filed: Oct. 10, 2019

(65) Prior Publication Data

US 2021/0036310 A1 Feb. 4, 2021

(51) Int. Cl.

| | |
|---|---|
| ***H01M 4/36*** | (2006.01) |
| ***H01M 10/0525*** | (2010.01) |
| ***H01M 10/0562*** | (2010.01) |
| *H01M 4/02* | (2006.01) |

(52) U.S. Cl.

CPC ....... *H01M 4/362* (2013.01); *H01M 10/0525* (2013.01); *H01M 10/0562* (2013.01); *H01M 2004/021* (2013.01); *H01M 2300/0068* (2013.01)

(58) Field of Classification Search

CPC ............. H01M 4/362; H01M 10/0525; H01M 10/0562; H01M 2004/021; H01M 2300/0068

See application file for complete search history.

(56) References Cited

U.S. PATENT DOCUMENTS

2021/0036311 A1* 2/2021 Matsumura ....... H01M 10/0562

FOREIGN PATENT DOCUMENTS

JP 2012243476 * 12/2012

* cited by examiner

*Primary Examiner* — Jayne L Mershon
(74) *Attorney, Agent, or Firm* — Vivacqua Crane PLLC

(57) ABSTRACT

An electrode including micro-sized secondary particle (MSSP) with enhanced ionic conductivity for solid-state battery is provided. The MSSP comprises a cathode particle and a solid-state electrolyte. The cathode particle is at least partially coated by solid-state electrolyte. The lithium ion transport inside the micro-sized secondary particles is increased by the incorporation of solid-state electrolyte. The electrode can be prepared by casting the slurry comprising MSSP, another electrolyte, binders, and conductive additives on the current collector. The current collector is comprised of a conductive material. The current collector has a first side and a second side. The electrode active material layer is disposed on one of the first and second sides of the current collector.

10 Claims, 4 Drawing Sheets

MICRO-SIZED SECONDARY PARTICLES WITH ENHANCED IONIC CONDUCTIVITY FOR SOLID-STATE ELECTRODE

INTRODUCTION

The present disclosure relates to lithium ion batteries and, more particularly, a micro-sized secondary particles (MSSP) with enhanced ionic conductivity for lithium-ion batteries.

With the fast development of portable electronic devices and electric vehicles demands lithium-ion batteries with high power, energy density, and thermal tolerance. Solid-state lithium-ion batteries are expected as one of the next generation energy storage devices. The solid-state electrolyte permits movement of lithium ions without the need for a soft membrane or liquid separating the electrodes. In a solid-state battery, for example, lithium ions move from the negative electrode to the positive electrode during discharge via the solid electrolyte which can conduct lithium ions through vacancies in the electrolyte crystal lattice.

Traditional micro-sized secondary particles composed of nano-sized primary electrode material particles are widely used in the lithium ion batteries using a liquid electrolyte. This agglomerated secondary particle may provide certain advantages over the primary particles, including superior powder capability, good processability during slurry coating, improved tap density and energy density. However, in solid-state batteries, the bulk ionic conductivity of this traditional micro-sized secondary particle is very poor, due to the lack of flowing and penetrating Li+ conductive agent.

SUMMARY

Accordingly, it is desirable to provide a novel micro-sized secondary particle with enhanced bulk ionic conductivity for a solid-state battery application.

Thus, while current micro-sized secondary particles achieve their intended purpose in the traditional liquid electrolyte lithium ion batteries, there is a need for a new and improved design for enhanced ionic conductivity of micro-sized secondary particles in solid-state batteries.

According to several aspects, an electrode with enhanced ionic conductivity for a lithium ion battery is provided. In one embodiment, the electrode comprises a current collector and an electrolytic layer. Moreover, the current collector has a first side and a second side. The current collector is comprised of a conductive material. In this embodiment, the electrolytic layer comprises a micro-sized secondary particle including a primary particle and a solid-state electrolyte (SSE). The electrolytic layer is disposed on one of the first and second sides of the current collector.

In one embodiment, the electrode further comprises an ionic conductive electrolyte, an electronic conductive additive, and an electrode material.

In these embodiments, the micro-sized secondary particle has an average diameter of between about 1.0 micrometer and about 20 micrometers. Moreover, the primary particle is at least partially coated by the solid-state electrolyte.

In an example of the present disclosure, the electrolytic layer is a cathode layer and the primary particle is a cathode material. The micro-sized secondary particle has a tap density of greater than about 1.0 g/cm$^3$. The electrolytic layer is an anode layer and the primary particle is an anode material. The micro-sized secondary particle has a tap density of greater than about 0.5 g/cm$^3$.

In another embodiment, the solid-state electrolyte comprises one of a Garnet type, a LISICON type, a NAS ICON type, a Perovskite type, a Sulfide, a Hydride, a Halide, a Borate; a Nitride, a LiPON, a Polymer, and an antiperovskite solid-state electrolyte. The total mass ratio of the solid-state electrolytes in the electrode is between about 0% and about 50%.

In this embodiment, the cathode material comprises one of a rock salt layered oxide, a spinel cathode, a phosphate, a silicate, and a sulfur cathode material. The anode material comprises one of lithium titanium oxide, a metal oxide, a metal sulfide, silicon, a silicon-alloy, a lithium-alloy, and a carbonaceous anode.

In another example of the present disclosure, a battery with enhanced ionic conductivity is provided. The battery comprises a cell core comprising a positive electrode, a negative electrode and a separator. In this embodiment, the positive electrode comprises a cathode layer and a positive current collector. Moreover, the positive current collector is comprised of a conductive material. The positive current collector has a first side and a second side. In this embodiment, the cathode layer comprises a micro-sized secondary cathode particle including a cathode particle and a first solid-state electrolyte. The cathode layer is disposed on one of the first and second sides of the positive current collector.

In one embodiment, the negative electrode comprises an anode layer and a negative current collector. Moreover, the negative current collector is comprised of a conductive material, and has a first side and a second side. In this embodiment, the anode layer comprises a micro-sized secondary anode particle including an anode particle and a second solid-state electrolyte. The anode layer is disposed on one of the first and second sides of the negative current collector. The separator layer is disposed between the positive electrode and the negative electrode.

In these embodiments, the first solid-state electrolyte comprises Sulfide SSEs, a Hydride SSE, a Halide SSE, a Borate SSE; a Nitride SSE, a LiPON, a Polymer, and an antiperovskite. The second solid-state electrolyte comprises one of a Garnet type, a LIS ICON type, a NASICON type, a Perovskite type, a Sulfide, a Hydride, a Halide, a Borate; a Nitride, a LiPON, a Polymer, or an antiperovskite solid-state electrolyte.

In these embodiments, the cathode material comprises one of a rock salt layered oxide, a spinel, a phosphate, a silicate, and a sulfur cathode material. Also, the anode material comprises one of lithium titanium oxide, a metal oxide, a metal sulfide, silicon, a silicon-alloy, a lithium-alloy, and a carbonaceous anode. Each of the micro-sized secondary cathode particle and the micro-sized secondary anode particle has an average diameter of between about 1.0 micrometer and about 20 micrometers, a tap density of greater than about 1.0 g/cm$^3$, and a tap density of greater than about 0.5 g/cm$^3$.

In another example of the present disclosure, a method of making an electrode with enhanced ionic conductivity for a battery is provided. The method comprises providing an electrode material and a first solid-state electrolyte. In this example, the method further comprises mixing the electrode material and the first solid-state electrolyte to disperse the first solid-state electrolyte within the electrode material. The method further comprises drying the solution, defining micro-sized secondary particles having enhanced ionic conductivity. Moreover, the method further comprises mixing the micro-sized secondary particles with a second solid-state electrolyte, a binder, a conductive additive, and a solvent to define a slurry. The method further comprises casting the slurry onto a current collector, defining the electrode.

In another example, the step of providing an electrode material and a first solid-state electrolyte comprises providing a solid electrolyte and an electrode material precursor wherein the solid electrolyte comprises one of a Garnet type, a LISICON type, a NASICON type, a Perovskite type, a sulfide, a hydride, a Halide, a borate; a nitride, a LiPON, a Polymer, and an antiperovskite solid-state electrolyte. In this example, the electrode material precursor comprises one of lithium titanium oxide, a transitional metal oxide, a phosphate precursor, a silicate precursor. The step of providing further comprises mixing the solid electrolyte and the electrode material precursor to define a precursor mixture and drying the precursor mixture to define an intermediate. The step of providing further comprises heating the intermediate at a certain temperature of about 300 C to about 650 C for about 12 hours.

In another example of the disclosure, the step of providing an electrode material and a first solid-state electrolyte comprises providing a solid electrolyte precursor and an electrode material wherein the solid electrolyte precursor comprises one of a garnet type, a LISICON type, a NASICON type, a Perovskite type, a sulfide, a borate, and a nitride solid-state electrolyte. In this example, the electrode material comprises one of a rock salt layered oxide, a spinel, a phosphate, a silicate, a sulfur cathode material, lithium titanium oxide, a metal oxide, a metal sulfide, silicon, a silicon-alloy, a lithium-alloy, and a carbonaceous anode material. The step of providing further comprises mixing the solid electrolyte precursor and the electrode material to define a precursor mixture and drying the precursor mixture to define an intermediate. The step of providing further comprises heating the intermediate at a certain temperature of about 300 C to about 650 C for about 12 hours.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figures 1A, 1B:
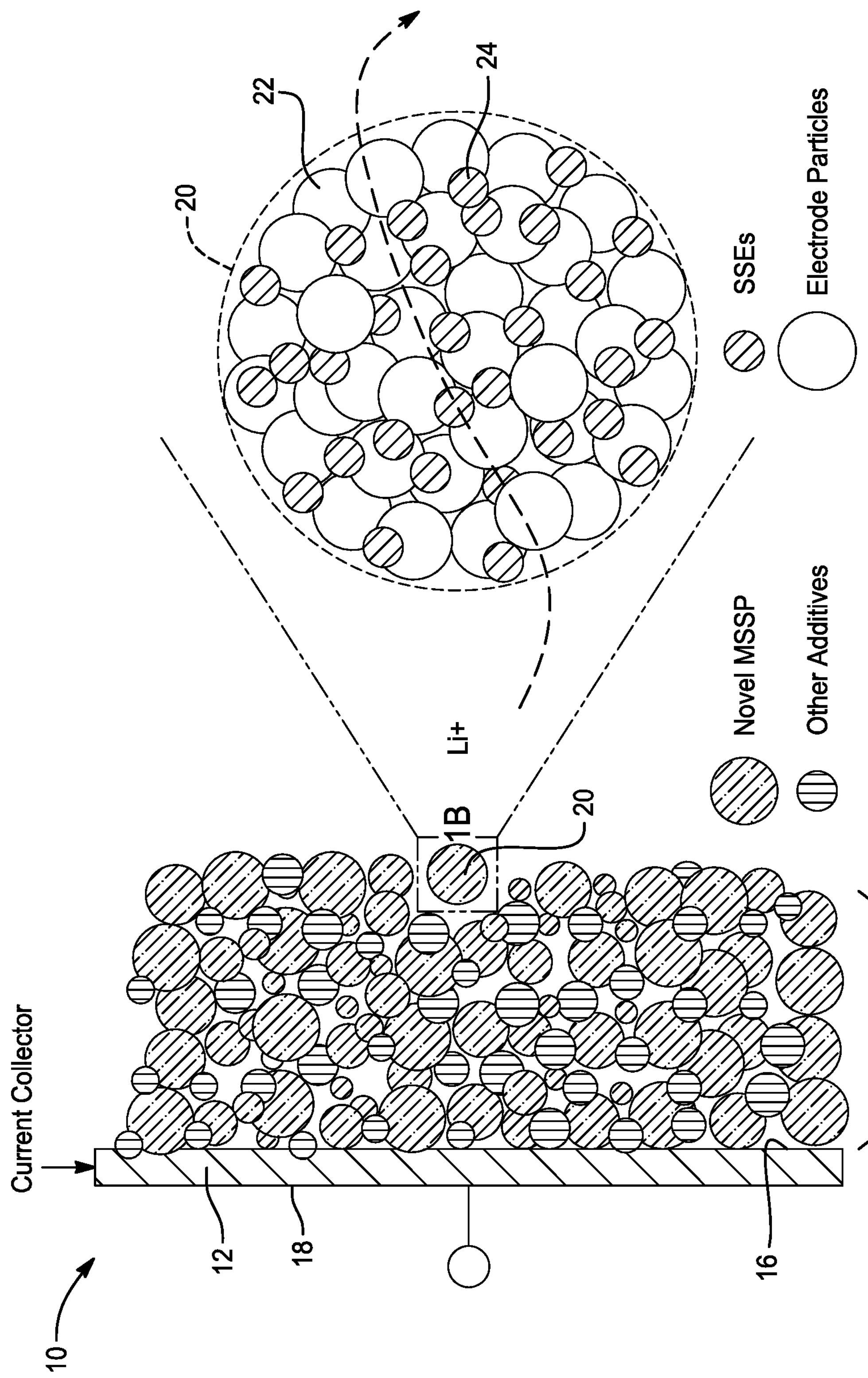
FIG. 1A is a cross-sectional view of a conceptual image of an anode electrode with enhanced ionic conductivity for a battery in accordance with one embodiment of the disclosure.
FIG. 1B is an enlarged view of a micro-sized secondary particle depicted in circle 2 of FIG. 1.

Referring to FIGS. 1A and 1B, an electrode 10 with enhanced ionic conductivity for a battery, such as a lithium ion battery, is provided in accordance with one embodiment of the present disclosure. As shown, the electrode comprises a current collector 12 and an electrolytic layer 14. Moreover, the current collector 12 has a first side 16 and a second side 18. The current collector 12 is comprised of a conductive material.

In this embodiment, the electrolytic layer 14 comprises a micro-sized secondary particle 20 including a primary electrode material particle 22 and a solid-state electrolyte 24. Preferably, the micro-sized secondary particle has an average diameter of between about 1.0 micrometer and about 20 micrometers. Moreover, the primary particle is at least partially coated by the solid-state electrolyte.

Figure 2A:
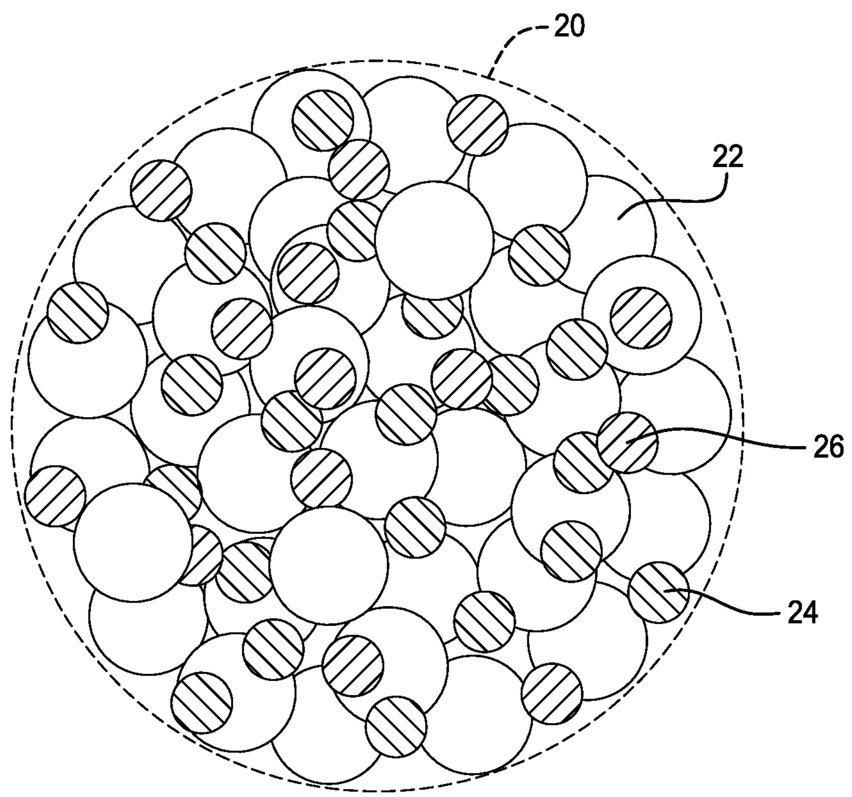
FIG. 2A is an enlarged view of a micro-sized secondary particle in accordance with another embodiment.
Figure 2B:
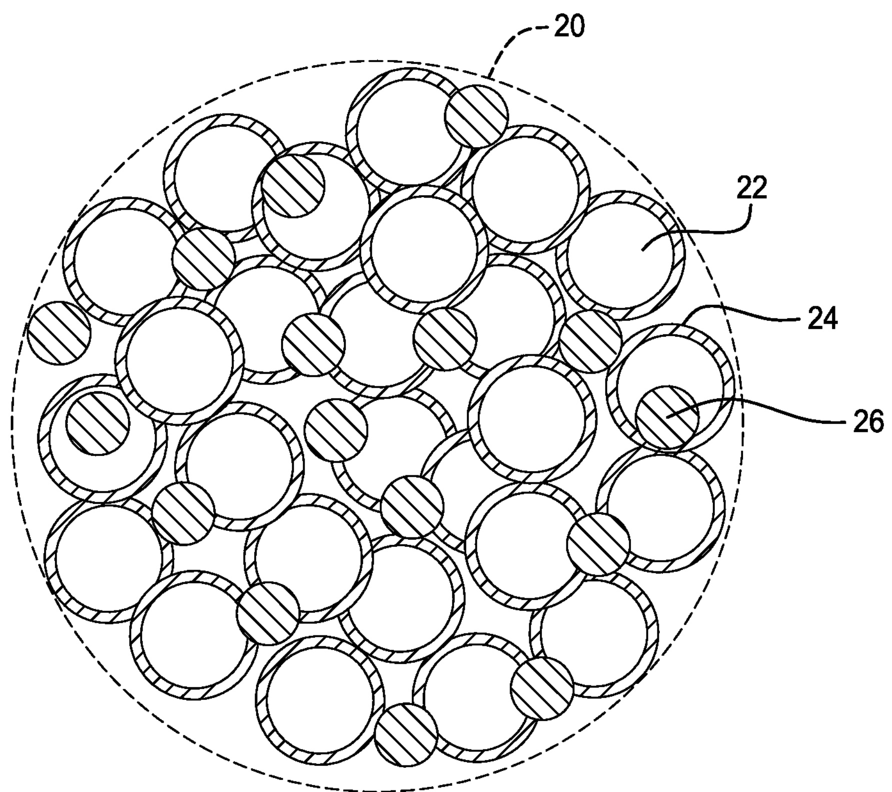
FIG. 2B is an enlarged view of a micro-sized secondary particle in accordance with yet another embodiment.

As shown in FIGS. 1A-1B, the electrolytic layer 14 is disposed on one of the first and second sides 16, 18 of the current collector 12. Preferably, the electrolytic layer 14 is disposed on the first side 16 of the current collector 12. Additionally, as shown in FIG. 2A, the electrode 10 may further comprise additives 26 such as an ionic conductive electrolyte, an electronic conductive additive, and an electrode material. As shown in FIG. 2B, the micro-sized secondary particle 20 comprise the primary particle 22 being coated, fully or partially, by the solid-state electrolyte 24 and having additives 26.

It is to be understood that the electrolytic layer 14 may be a cathode layer or an anode layer. In one embodiment, the electrolytic layer is a cathode layer and the primary particle is a cathode material. In this embodiment, the micro-sized secondary particle has a tap density of greater than about 1.0 g/cm$^3$. In another embodiment, the electrolytic layer is an anode layer and wherein the primary particle is an anode material. In this example, the micro-sized secondary particle has a tap density of greater than about 0.5 g/cm$^3$.

Preferably, the solid-state electrolyte may comprise one of a Garnet type, a LISICON type, a NASICON type, a Perovskite type, a Sulfide, a Hydride, a Halide, a Borate; a Nitride, a LiPON, a Polymer, an antiperovskite solid-state electrolyte and composite thereof. Moreover, the solid-state electrolyte and the electrode may have a mass ratio of between about 0% and about 50%.

In this embodiment, the cathode material may comprise one of a rock salt layered oxide, a spinel, a phosphate, a silicate, and a sulfur cathode material. Additionally, the anode material may comprise one of lithium titanium oxide, a metal oxide, a metal sulfide, silicon, a silicon-alloy, a lithium-alloy, and a carbonaceous anode.

Figure 3:
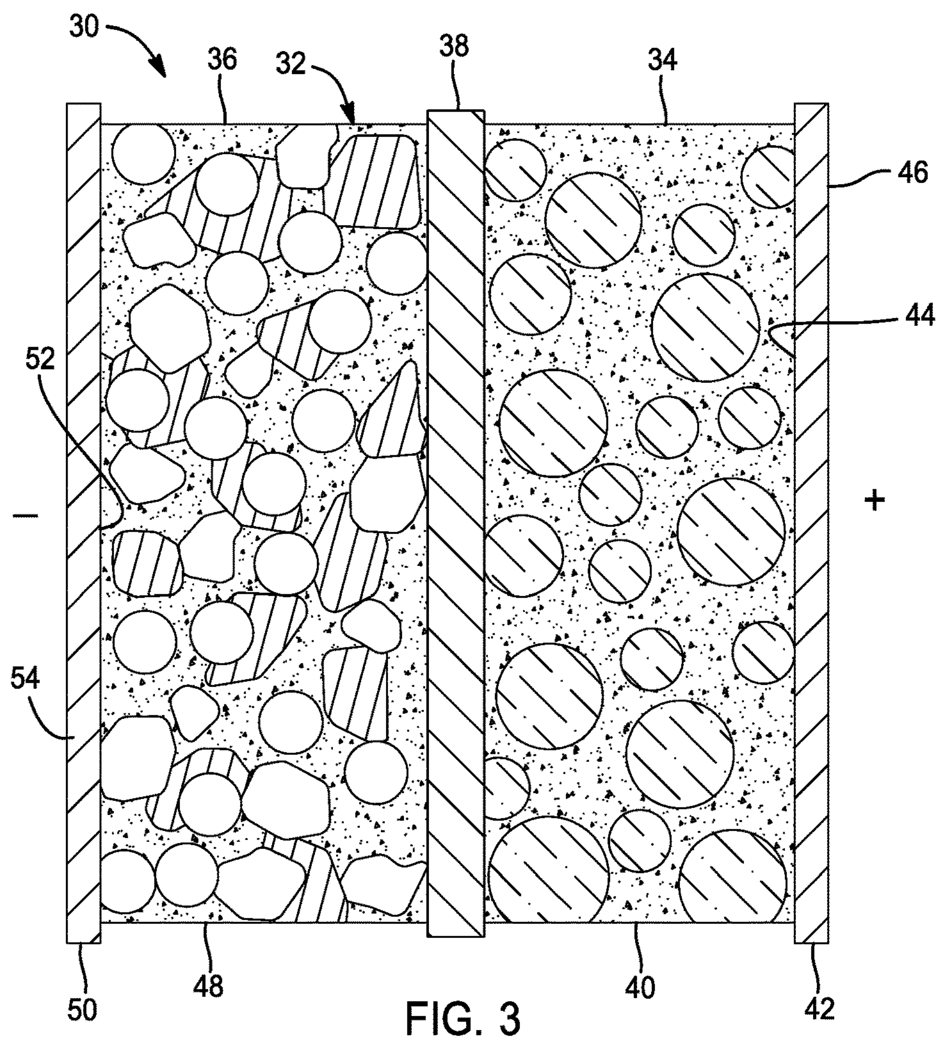
FIG. 3 is cross-sectional view of a conceptual image of a battery with enhanced ionic conductivity in accordance with another embodiment of the present disclosure.

Referring to FIG. 3, a battery 30 with enhanced ionic conductivity is provided in accordance with another embodiment of the present disclosure. As shown, the battery 30 comprises a cell core 32 comprising a positive electrode 34, a negative electrode 36 and a separator 38. In this embodiment, the positive electrode 34 comprises a cathode layer 40 and a positive current collector 42. The positive current collector 42 is comprised of a conductive material. As shown, the positive current collector 42 has a first side 44 and a second side 46.

Preferably, similar to the electrode 10 of FIGS. 1A-1B, the cathode layer 40 in FIG. 3 comprises a micro-sized secondary cathode particle including a cathode particle and a first solid-state electrolyte. In this embodiment, the cathode layer 40 is disposed on one of the first and second sides 44, 46 of the positive current collector 42. As shown, the cathode layer 40 is disposed on the first side 44 of the positive current collector 42.

FIG. 3 further illustrates the negative electrode 36 having an anode layer 48 and a negative current collector 50. As shown, the negative current collector 50 is comprised of a conductive material, and has a first side 52 and a second side 54. Preferably, similar to the electrode 10 of FIGS. 1A-1B, the anode layer 48 in FIG. 3 comprises a micro-sized secondary anode particle including an anode particle and a second solid-state electrolyte. The anode layer 48 is disposed on one of the first and second sides 52, 54 of the negative current collector 50. As shown, the anode layer 48 is disposed on the first side 52 of the negative current collector 50. Moreover, the separator layer 38 is disposed between the positive electrode 34 and the negative electrode 36.

In this embodiment, the first solid-state electrolyte comprises one of a Garnet type, a LISICON type, a NASICON type, a Perovskite type, a Sulfide SSEs, a Hydride, a Halide, a Borate; a Nitride, a LiPON, a Polymer, and an antiperovskite solid-state electrolyte. The second solid-state electrolyte may comprise one of a Garnet type, a LISICON type, a NASICON type, a Perovskite type, a Sulfide, a Hydride, a Halide, a Borate; a Nitride, a LiPON, a Polymer and an antiperovskite solid-state electrolyte.

Preferably, the cathode material comprises one of a rock salt layered oxide, a spinel, a phosphate, a silicate, and a sulfur cathode material. As such, the anode material comprises one of lithium titanium oxide, a metal oxide, a metal sulfide, silicon, a silicon-alloy, a lithium-alloy, and a carbonaceous anode.

In this embodiment, each of the micro-sized secondary cathode particle and the micro-sized secondary anode particle has an average diameter of between about 1.0 micrometer and about 20 micrometers, a tap density of greater than about 1.0 $g/cm^3$, and a tap density of greater than about 0.5 $g/cm^3$.

Figure 4:
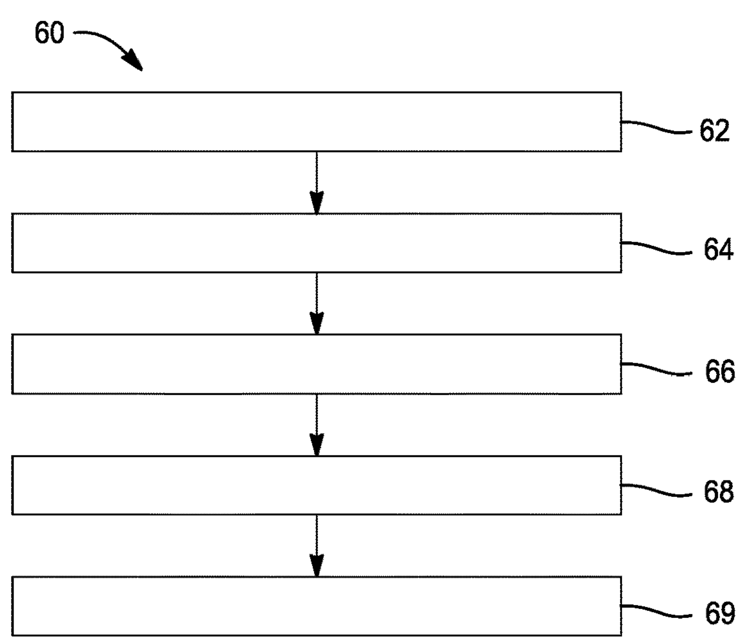
FIG. 4 is a flowchart of a method of making an electrode with enhanced ionic conductivity for a battery in accordance with one example of the present disclosure.

FIG. 4 illustrates a method 60 of making an electrode with enhanced ionic conductivity for a battery in accordance with an example of the present disclosure. As shown, the method 60 comprises a step 62 of providing an electrode material and a first solid-state electrolyte. Each of the electrode material and the first solid-state electrolyte may be pre-prepared or precursors may be used.

The method 60 further comprises a step 64 of mixing the electrode material and the first solid-state electrolyte to disperse the first solid-state electrolyte within the electrode material. In this example, the method 60 further comprises a step 66 of drying the solution, defining micro-sized secondary particles having enhanced ionic conductivity. The method 60 further comprises a step 68 of mixing the micro-sized secondary particles with a second solid-state electrolyte, a binder, a conductive additive, and a solvent to define a slurry. The method 60 further comprises a step 69 of casting the slurry onto a current collector, defining the electrode.

Figure 5:
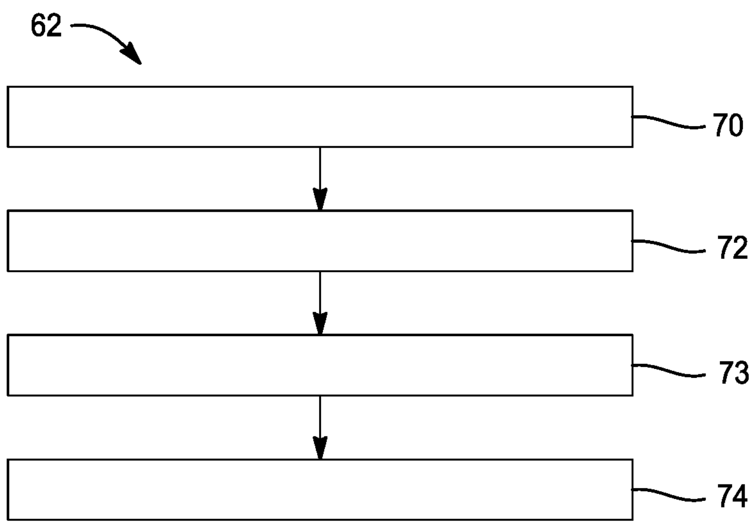
FIG. 5 is another flowchart of steps of providing an electrode material and a first solid-state electrolyte according to an exemplary embodiment.

As illustrated in FIG. 5, the step 62 of providing an electrode material and a first solid-state electrolyte may comprise a step 70 of providing a solid electrolyte and an electrode material precursor. In this example, the solid electrolyte may comprise a Garnet type, a LISICON type, a NASICON type, a Perovskite type, a sulfide solid-state electrolyte, a hydride, a Halide e, a borate, a nitride, a LiPON, a Polymer, an antiperovskite solid-state electrolyte and composite thereof.

Preferably, the electrode material precursor may comprise precursors of the cathodes or anode materials mentioned above, e.g. lithium titanium oxide precursor, a transitional metal oxide precursor, a phosphate precursor, a silicate precursor. The step 70 of providing further comprises a step 72 of mixing the solid electrolyte and the electrode material precursor to define a precursor mixture and a step 73 of drying the precursor mixture to define an intermediate. The step 70 of providing further comprises a step 74 of heating the intermediate at a certain temperature of about 300 C to about 650 C for about 12 hours.

Figure 6:
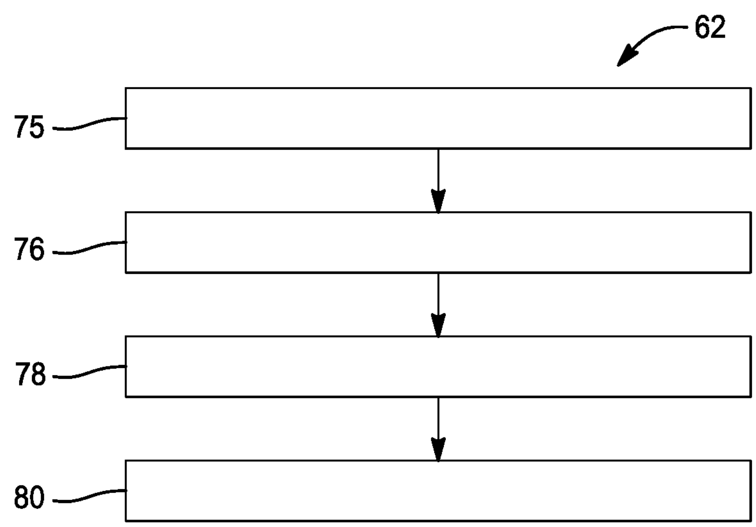
FIG. 6 is another flowchart of steps of providing an electrode material and a first solid-state electrolyte.

As depicted in FIG. 6, the step 70 of providing may comprise a step 75 of providing a solid electrolyte precursor and an electrode material. In this example, the solid electrolyte precursor may comprise one of a garnet type, a LISICON type, a NASICON type, a Perovskite type, a sulfide, a borate, and a nitride solid-state electrolyte.

Preferably, the electrode material comprises one of a rock salt layered oxide, a spinel, a phosphate, a silicate, a sulfur cathode material, lithium titanium oxide, a metal oxide, a metal sulfide, silicon, a silicon-alloy, a lithium-alloy, and a carbonaceous anode.

The step 70 of providing further comprises a step 76 of mixing the solid electrolyte and the electrode material precursor to define a precursor mixture and a step 78 of drying the precursor mixture to define an intermediate. The step 70 of providing further comprises a step 80 heating the intermediate at a certain temperature of about 300 C to about 650 C for about 12 hours.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An electrode with enhanced ionic conductivity for a lithium ion battery, the electrode comprising:

a current collector comprising a conductive material, the current collector comprising a positive current collector having a first side and a second side; and an electrolytic layer comprising a micro-sized secondary particle including an active material primary particle and a solid-state electrolyte, the solid-state electrolyte and the active material primary particle being mixed together and heated to between about 300° C. and about 650° C. for about 12 hours, the electrolytic layer disposed on one of the first and second sides of the current collector, wherein a total mass ratio of the solid-state electrolyte in the electrode is up to about 50%;

wherein the micro-sized secondary particle having an average diameter of between about 1.0 micrometer and about 20 micrometers; and wherein the micro-sized secondary particle has a tap density of greater than about 0.5 g/cm3.

2. The electrode of claim 1 further comprising a second ionic conductive electrolyte, an electronic conductive additive, and an electrode material.

3. The electrode of claim 1 wherein the primary particle in the micro-sized secondary particle is at least partially coated by the solid-state electrolyte.

4. The electrode of claim 1 wherein the electrolytic layer is a cathode layer and wherein the primary particle is a cathode material.

5. The electrode of claim 4 wherein the micro-sized secondary particle has a tap density of greater than about 1.0 g/cm3.

6. The electrode of claim 4 wherein the cathode material comprises one of a rock salt layered oxide, a spinel cathode, a phosphate, a silicate, and a sulfur cathode material.

7. The electrode of claim 1 further comprising a negative current collector wherein the electrolytic layer is an anode layer and wherein the primary particle is an anode material.

8. The electrode of claim 7 wherein the anode material comprises one of lithium titanium oxide, a metal oxide, a metal sulfide, silicon, a silicon-alloy, a lithium-alloy, and a carbonaceous anode.

9. The electrode of claim 1 wherein the solid-state electrolyte comprises one of a Garnet type, a LISICON type, a NASICON type, a Perovskite type, a Sulfide, a Hydride, a Halide, a Borate; a Nitride, a LiPON, a Polymer, an anti-perovskite solid-state electrolyte and composite thereof.

10. A solid-state battery comprising:

an electrode with enhanced ionic conductivity for a lithium ion battery, the electrode comprising:

a current collector comprising a conductive material, the current collector comprising a positive current collector having a first side and a second side; and an electrolytic layer comprising a micro-sized secondary particle including an active material primary particle and a solid-state electrolyte, the solid-state electrolyte and the active material primary particle being mixed together and heated to between about 300° C. and about 650° C. for about 12 hours, the electrolytic layer disposed on one of the first and second sides of the current collector, wherein a total mass ratio of the solid-state electrolyte in the electrode is up to 50%;

wherein the micro-sized secondary particle having an average diameter of between about 1.0 micrometer and about 20 micrometers; and wherein the micro-sized secondary particle has a tap density of greater than about 0.5 g/cm3.

* * * * *